(12) United States Patent
Griffith (10) Patent No.: US 11,673,508 B2
(45) Date of Patent: Jun. 13, 2023

(54) LATCH DEVICE

(71) Applicant: Rivian IP Holdings, LLC, Plymouth, MI (US)

(72) Inventor: Eric Griffith, Farmington Hills, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 78 days.

(21) Appl. No.: 17/130,202

(22) Filed: Dec. 22, 2020

(65) Prior Publication Data
US 2022/0194301 A1 Jun. 23, 2022

(51) Int. Cl.
| | | |
|---|---|---|
| *B60R 9/00* | (2006.01) |
| *B60R 11/00* | (2006.01) |
| *E05B 85/24* | (2014.01) |
| *E05B 85/26* | (2014.01) |

(52) U.S. Cl.
CPC .......... *B60R 9/00* (2013.01); *B60R 2011/004* (2013.01); *B60R 2011/005* (2013.01); *E05B 85/243* (2013.01); *E05B 85/26* (2013.01)

(58) Field of Classification Search
CPC ......... B60P 7/0807; B60R 9/058; B60R 9/00; E05B 15/022; E05B 17/2088; E05B 81/22; Y10T 24/45487; B60N 2/309
USPC ................................................. 224/402–403
See application file for complete search history.

(56) References Cited

U.S. PATENT DOCUMENTS

| | | | | |
|---|---|---|---|---|
| 10,870,453 B2 * | 12/2020 | Elder | ...................... | B60R 9/052 |
| 2005/0184549 A1 * | 8/2005 | Robinson | ............... | B60N 2/236 |
| | | | | 296/65.03 |
| 2020/0080348 A1 * | 3/2020 | Cappelli | ................. | E05B 81/06 |

FOREIGN PATENT DOCUMENTS

| | | | |
|---|---|---|---|
| DE | 4222051 | * | 8/1993 |
| EP | 3552880 A1 | | 10/2019 |
| FR | 2753738 | * | 3/1998 |

OTHER PUBLICATIONS

Nov. 8, 2021 European Search Report issued in International Application No. 21184090.

* cited by examiner

*Primary Examiner* — Adam J Waggenspack
(74) *Attorney, Agent, or Firm* — Clements Bernard Walker; Christopher L. Bernard (57) ABSTRACT

An illustrative embodiment includes a latch rotatably mounted on a support bracket and including first and second flanges that define therebetween a notch configured to receive a striker bar. The latch is rotatable into a closed position with the striker bar received in the notch responsive to the first flange being moved against the striker bar. A pawl having an inner edge and a cam edge is rotatably mounted on the support bracket. An outer side of the first flange is configured to engage the inner edge to hold the pawl in an unlocked position responsive to the latch being in an open position. The pawl is configured to rotate and the cam edge is configured to move against the first side of the first flange to hold the latch in the closed position responsive to the latch rotating past the inner edge of the pawl.

20 Claims, 12 Drawing Sheets

LATCH DEVICE

INTRODUCTION

The present disclosure relates to a latch device such as may be used to secure an object to a vehicle or another body.

The statements in this section merely provide background information related to the present disclosure and may not constitute prior art.

Some vehicles, including cars, trucks, and sport-utility vehicles, include roof rails or other anchors to which objects can be attached to hold or secure cargo. For example, rack systems, such as roof racks, truck bed racks, cargo carriers, or other objects may be attachable to anchors on the vehicle to allow for bicycles, kayaks or other small boats, luggage, or miscellaneous cargo to be carried by the vehicle outside of a trunk, truckbed, or passenger compartment of a vehicle.

Many currently-known rack systems may be difficult to attach to roof rails, truckbed rails, or other anchors on the vehicle. Many racks are attached to anchors with clamps or straps that wrap around the anchors. Many such rack systems have to be tightened with wrenches with other tools to secure the racks in place. The process may be both cumbersome and time-consuming.

Moreover, when attempting to attach currently-known rack systems to rails or other anchors that are covered with dirt or ice, difficulties may be encountered in securing the clamps or straps over the dirt or ice encrusting the rails or anchors. Moreover, if dirt or ice between the clamps or straps and the rails or anchors falls away, then the clamps or straps may then be only loosely secured to the anchors. As a result, the rack system may rattle, slide across the anchors, or possibly fall off.

BRIEF SUMMARY

Disclosed embodiments include apparatuses, systems, and methods for a latch device.

In an illustrative embodiment, an apparatus includes a support bracket. A latch is rotatably mounted on the support bracket and has a first flange and a second flange. An inner side of the first flange and an inner side of the second flange define therebetween a notch configured to receive a striker bar. The latch is rotatable in a first rotational direction into a closed position with the striker bar received in the notch responsive to the first flange being moved against the striker bar. A pawl is rotatably mounted on the support bracket. The pawl has an inner edge and a cam edge. An outer side of the first flange is configured to engage the inner edge to hold the pawl in an unlocked position responsive to the latch being in an open position with the notch facing the striker bar. The pawl is configured to rotate in the first rotational direction and the cam edge is configured to move against the first side of the first flange to hold the latch in the closed position responsive to the latch rotating in the first rotational direction past the inner edge of the pawl.

In another illustrative embodiment, a system includes a securable apparatus configured to be joinable to a support body. At least one latch device is coupled to the securable apparatus. The latch device includes a support bracket. A latch is rotatably mounted on the support bracket and has a first flange and a second flange. An inner side of the first flange and an inner side of the second flange define therebetween a notch configured to receive a striker bar. The latch is rotatable in a first rotational direction into a closed position with the striker bar received in the notch responsive to the first flange being moved against the striker bar. A pawl is rotatably mounted on the support bracket. The pawl has an inner edge and a cam edge. An outer side of the first flange is configured to engage the inner edge to hold the pawl in an unlocked position responsive to the latch being in an open position with the notch facing the striker bar. The pawl is configured to rotate in the first rotational direction and the cam edge is configured to move against the first side of the first flange to hold the latch in the closed position responsive to the latch rotating in the first rotational direction past the inner edge of the pawl.

In a further illustrative embodiment, a method includes rotatably mounting a latch on a support bracket, with the latch having a first flange and a second flange where an inner side of the first flange and an inner side of the second flange define therebetween a notch configured to receive a striker bar. Responsive to the first flange being moved against the striker bar, the latch is rotated in a first rotational direction into a closed position with the striker bar received in the notch. The pawl is rotatably mounted on the support bracket with the pawl having an inner edge and a cam edge. Responsive to the latch being in an open position with the notch facing the striker bar, an outer side of the first flange engages with the inner edge to hold the pawl in an unlocked position. Responsive to the latch rotating in the first rotational direction past the inner edge of the pawl, the pawl is rotated in the first rotational direction, moving the cam edge against the first side of the first flange to hold the latch in the closed position.

Further features, advantages, and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings.

DETAILED DESCRIPTION

The following description is merely illustrative in nature and is not intended to limit the present disclosure, application, or uses. It will be noted that the first digit of three-digit reference numbers and the first two digits of four-digit reference numbers correspond to the first digit of one-digit figure numbers and the first two digits of two-digit figure numbers, respectively, in which the element first appears.

The following description explains, by way of illustration only and not of limitation, various embodiments of apparatuses, systems, and methods for a latch device.

Figure 1:
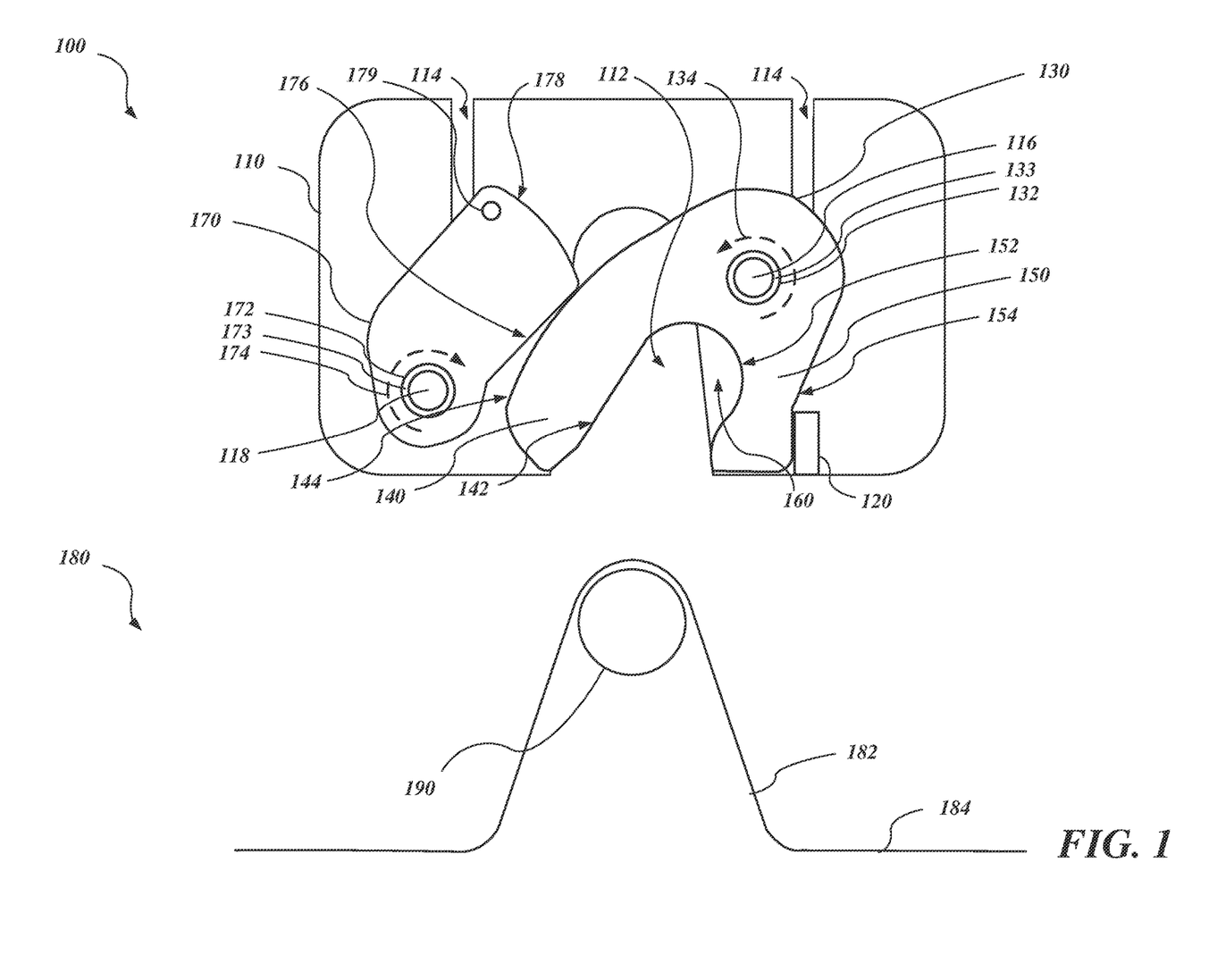
FIG. 1 is a plan view of a latch device and a mount supporting a striker bar to which the latch is couplable.

Referring to FIG. 1, in various embodiments, a latch device 100 is securable to a mount 180 by moving the latch device 100 against the mount 180. In various embodiments, the latch device 100 includes a support bracket 110 that supports a latch 130 and a pawl 170. The latch 130 and the pawl 170 receive a striker bar 190 or similar structure that is supported by the mount 180. In various embodiments, the mount 180 may include one or more brackets 182 that support the striker bar 190 over a base 184 that is mounted or mountable onto a vehicle or other body (not shown in FIG. 1).

In various embodiments, the support bracket 110 defines a slot 112 that receives the striker bar 192 therethrough to enable the latch 130 to engage the striker bar 190. The support bracket 110 also may include one or more channels or other structures 114 that receive racks or other structures (not shown in FIG. 1) such as cross-members or brackets configured to receive and/or support cargo. The support bracket also includes a latch pivot 116 that rotatably supports the latch 130 and a pawl pivot 118 that rotatably supports the pawl 170. The support bracket 110 also includes a latch stop 120 that limits rotation of the latch 130 to hold the latch 130 in an open position, as further described below.

In various embodiments, the latch 130 includes a latch socket 132 that rotatably engages the latch pivot 116 extending from the support bracket 110. In various embodiments, the latch socket 132 engages the latch pivot 116 via a latch bushing 133. In various embodiments, the latch bushing 133 may include a biasing mechanism, such as a rotationally-coiled spring, that biases the latch 130 to rotate in a first rotational direction 134 (represented by a dashed line in FIG. 1) about the latch pivot 116.

The latch 130 includes a first flange 140 and a second flange 150. The first flange 140 includes an inner side 142 and an outer side 144. The second flange 150 includes an inner side 152 and an outer side 154. The inner side 142 of the first flange 140 and the inner side 152 of the second flange 150 define a notch 160. As further described below, the notch receives the striker bar 190 therein to secure the latch device 100 to the striker bar 190. The rotational biasing of the latch 130, when the latch 130 is not acted upon by other forces as described below, causes the latch 130 to rotate into an open position as shown in FIG. 1 in which the notch 160 at least partially coincides with the slot 112 in the support bracket 110. When the latch 130 is in the open position, the striker bar 190 is receivable into the notch 160 and the slot 112. The rotation of the latch 130 in the first rotational direction 134 is limited by the latch stop 120. The outer side 154 of the second flange 150 engages the latch stop 120 to hold the latch 130 in the open position to receive the striker bar 190 until the latch 130 is acted upon by other forces, as further described below.

In various embodiments, the pawl 170 includes a pawl socket 172 that rotatably engages the pawl pivot 118 extending from the support bracket 110. In various embodiments, the pawl socket 172 engages the pawl pivot 118 via a pawl bushing 173. In various embodiments, the pawl 173 may include a biasing mechanism, such as a rotationally-coiled spring, that bias the pawl 170 to rotate about the pawl pivot 118 in a second rotational direction 174 (represented by a dashed line in FIG. 1) that is an opposite rotational direction from the first rotational direction 134 in which the latch 130 is biased to rotate.

The pawl 170 includes an inner edge 176 and a cam edge 178. The inner edge 176 is configured to engage an outer side 144 of the first flange 140. The outer side 144 of the latch 130 thus limits rotation of the pawl 170 in the second rotational direction 174 when the latch 130 is held in the open position by the latch stop 120. As further described below, when the latch device 100 is moved to cause the striker bar 190 to engage the latch 130, the outer side 144 of the first flange 140 engages the inner edge of the pawl 170 to cause the pawl 170 to rotate away from the latch 130. As also further described below, the further rotation of the latch 170 causes the outer side 144 of the first flange 140 to move beyond the inner edge 176 of the pawl 170. As a result of the biasing of the pawl 170 to rotate about the pawl pivot 118 in the second rotational direction 174, the cam edge 178 rotates against the inner side 142 of the first flange 140 to hold the latch 130 in a closed position.

The pawl 170 also includes a release structure 179, which may be in the nature of a protrusion or an opening, to permanently or releasably receive a release member (not shown in FIG. 1). The release member, as further described below, enables a moment to be applied to the pawl 170 to rotate the pawl 170 in a rotational direction opposite the second rotational direction 174 in which the pawl 170 is biased to rotate. Rotation of the pawl 170 in a rotational direction opposite the second rotational direction 174 results in the cam edge 178 being withdrawn from against the inner surface 142 of the first flange 140. Withdrawal of the cam edge 178 from the inner surface 142 of the first flange 140 permits the latch 130 to rotate in the first rotational direction 134 toward the open position, thereby allowing the latch 130 to be released from the striker bar 190, as further described below.

Referring additionally to FIGS. 2-9, operation of the latch device 100 in securing the latching device 100 to the striker bar 190 and releasing the latch device 100 from the striker bar 190 is described. In the example of FIGS. 2-9, it is assumed that the latch device 100 is coupled with a structure, such as a rail, a cargo box, or a similar apparatus (none of which are shown in FIGS. 2-9) to join it to the striker bar 190 supported by a mount 180 that is mounted on a vehicle or other body (neither of which is shown in FIGS. 2-9).

Figure 2:
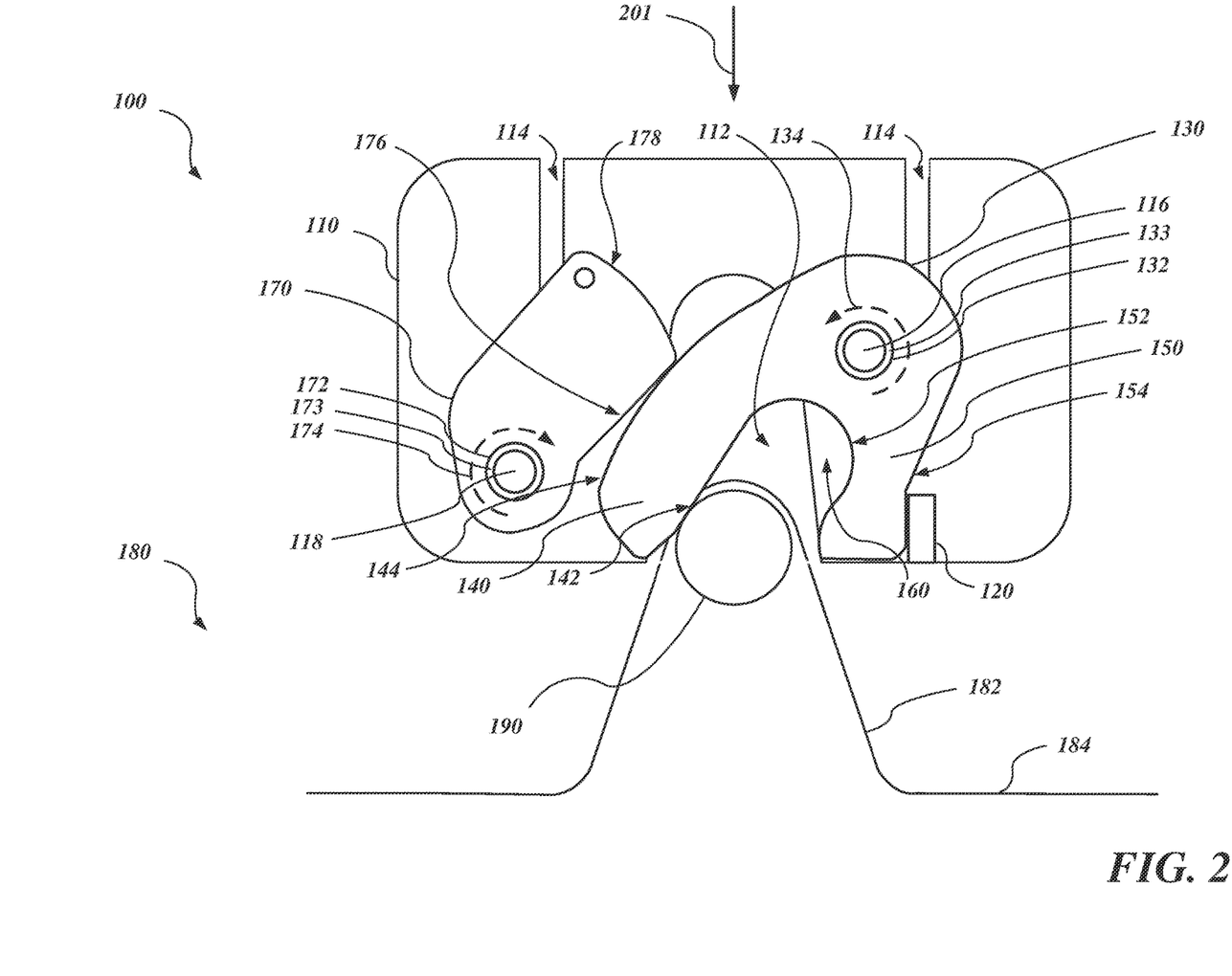
FIGS. 2-6 are plan views of the latch device of FIG. 1 being coupled to the striker bar.

As shown in FIG. 2, the latch device 100 is moved in a first direction 201 (represented by a dashed line in FIG. 2) toward the mount 180. The latch device 110 is moved in the first direction 201 until the inner side 142 of the first flange 140 engages the striker bar 190. As further described below, the engagement of the striker bar 190 with the first flange 140 of the latch 130 secures the latch device 100 to the striker bar 192 and, thus, to the mount 190 and the body to which it is attached.

Figure 3:
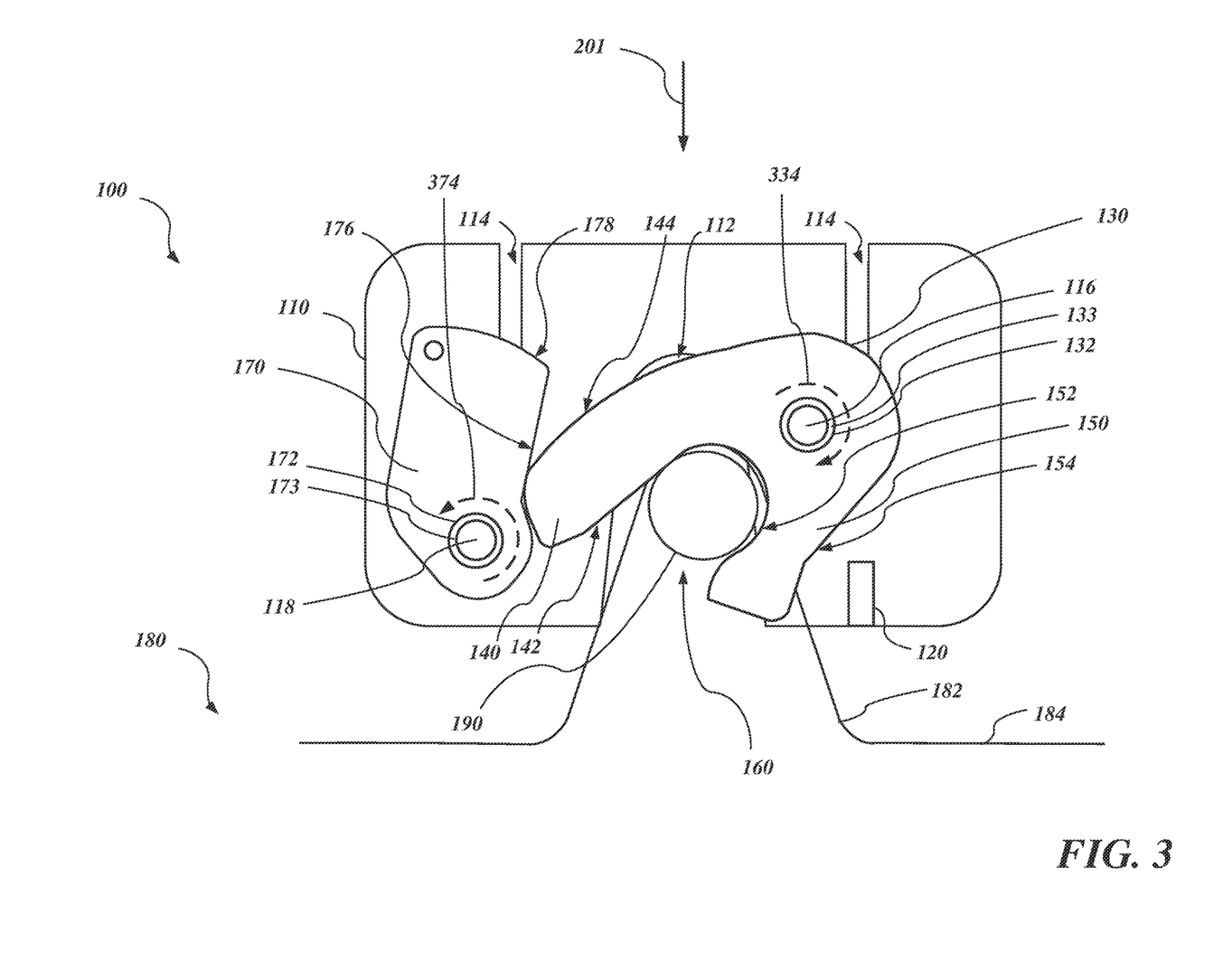

As shown in FIG. 3, the latch device 100 continues to be moved in the first direction 201 toward the mount 180. As a result, the striker bar 190 pushes against the inner surface 142 of the first flange 140, exerting a moment on the latch 130. As a result, the latch 130 rotates about the latch pivot 116 in a second rotational direction 334 opposite the first rotational direction 134 (FIG. 1) in which the latch 130 is biased, as previously described. As a result of the rotation of the latch 130, the outer surface 144 of the first flange 140 exerts a force on the inner edge 176 of the pawl 170 and, thus, exerts a moment on the pawl 170. The resulting moment causes the pawl 170 to rotate about the pawl pivot 118 in a first rotational direction 374 opposite the second rotational direction 174 (FIG. 1) in which the pawl 170 is biased to rotate.

Figure 4:
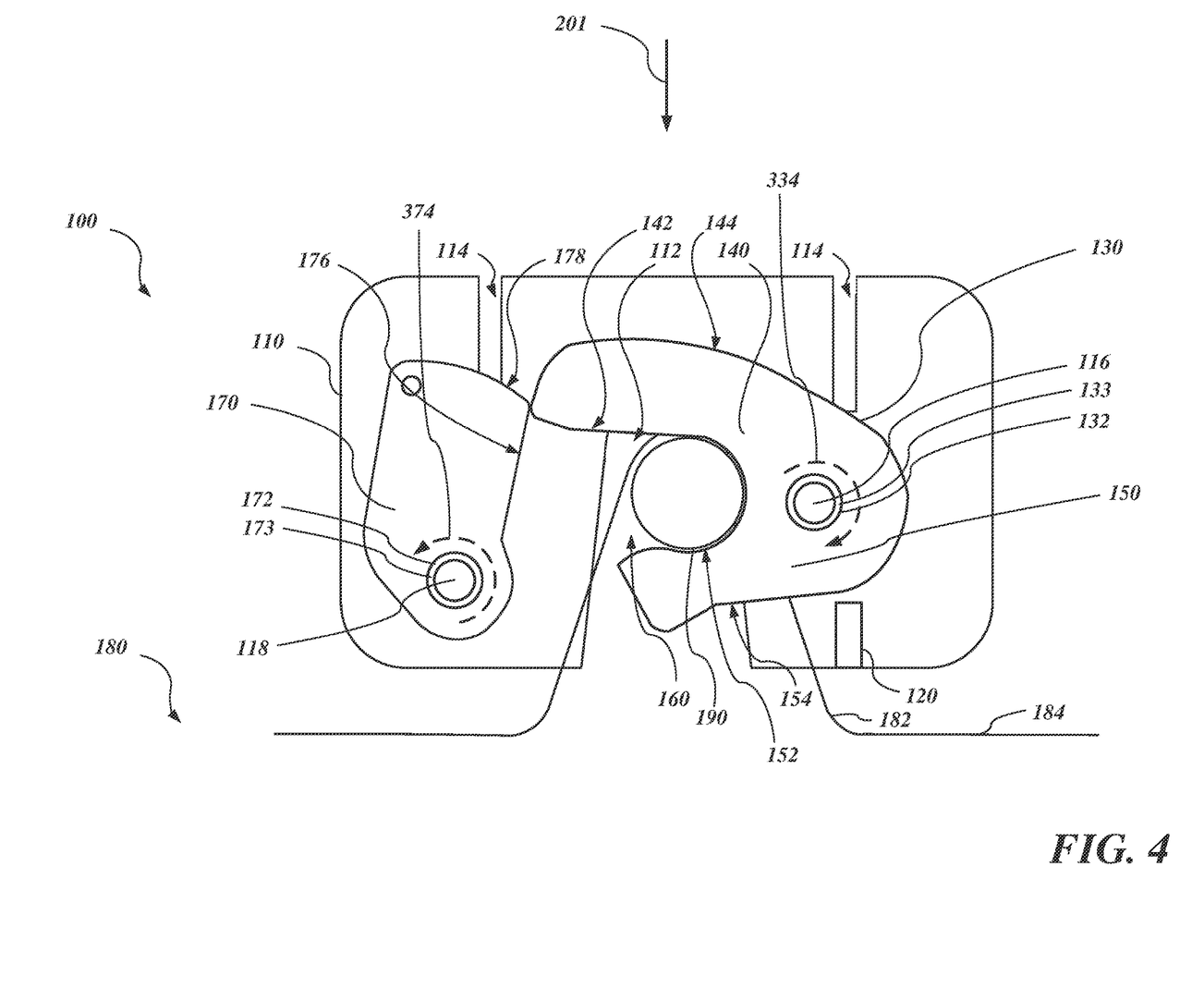

As shown in FIG. 4, the latch device 100 is further moved in the first direction 201 toward the mount 180. As a result, the striker bar 190 continues to push against the inner surface 142 of the first flange 140, further exerting a moment on the latch 130. As a result, the latch 130 continues to rotate about the latch pivot 116 in the second rotational direction 334. As a result of the further rotation of the latch 130, the outer surface 144 of the first flange 140 continues to exert a force on the inner edge 176 of the pawl 170 and, thus, continues to exert a moment on the pawl 170. The resulting moment causes the pawl 170 to continue to rotate about the pawl pivot 118 in a first rotational direction 374. As a result, the outer surface 144 of the first flange 140 moves nearly past the inner edge 176 of the pawl 170. Thus, the pawl 170 is nearly in a position where it will be released from the outer surface 144 of the first flange 140 and will be able to rotate in the second rotational direction 174 (FIG. 1) in which it is biased, as further described below.

Figure 5:
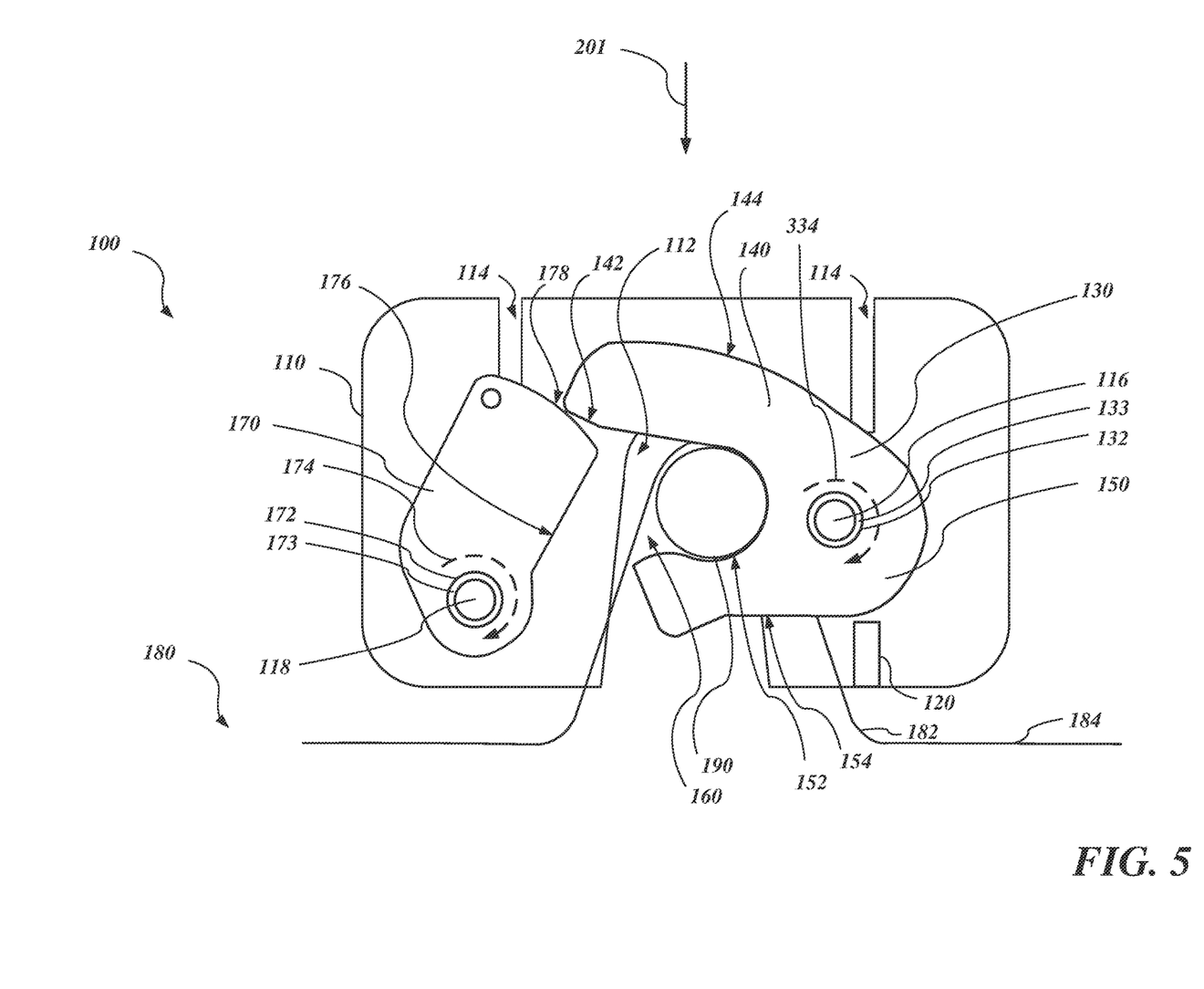

As shown in FIG. 5, the latch device 100 is still further moved in the first direction 201 toward the mount 180. As a result, the striker bar 190 continues to push against the inner surface 142 of the first flange 140, further exerting a moment on the latch 130. As a result, the latch 130 continues to rotate about the latch pivot 116 in the second rotational direction 334. As a result of the further rotation of the latch 130, the outer surface 144 of the first flange 140 slips past the inner edge 176 of the pawl 170. As a result, the pawl 170 rotates in the second rotational direction 174 in which it is biased. The cam edge 178 of the pawl 170 then engages the inner surface 142 of the first flange 140. The force exerted by the cam edge 178 of the pawl 170 on the inner surface 142 of the first flange 140 thus will prevent the latch 130 from being able to rotate in the first rotational direction 134 (FIG. 1) in which it is biased. The rotation of the pawl 170 thus puts the latch device 110 into a locked position.

With reference to FIG. 5, the pawl 170 can help hold the latch 130 in a locked position even if materials (such as dirt, ice, or other materials) on the striker bar 190 prevent the pawl 170 from being able to rotate against the striker bar 190. Once the pawl 170 is able to block rotation of the latch 130 in the first rotational direction 134 (FIG. 1), the latch device 100 remains in a locked position with the latch 130 unable to rotate back to the open position of FIGS. 1 and 2 until the pawl 170 is released, as further described below with reference to FIGS. 7-9.

Figure 6:
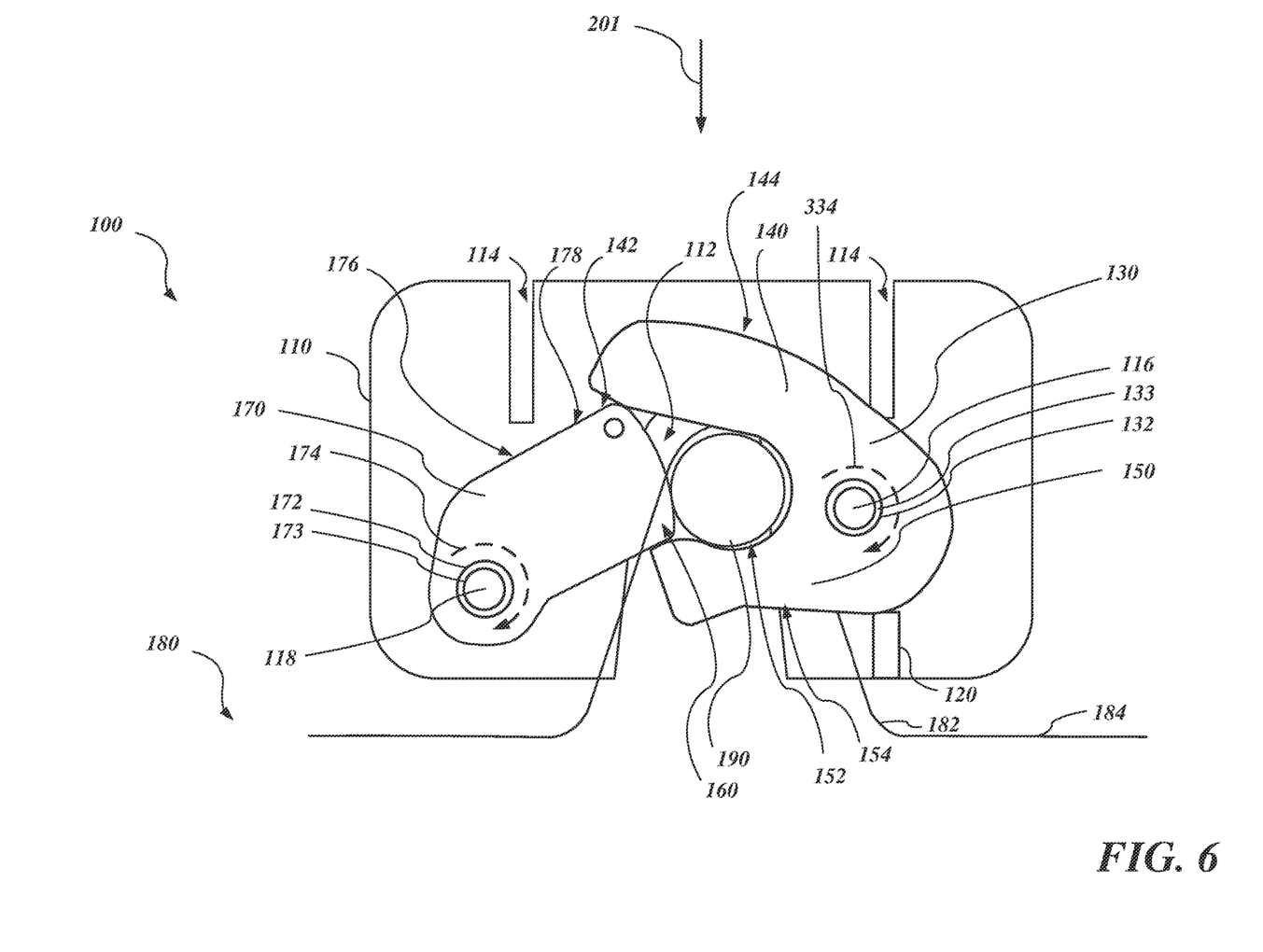

As shown in FIG. 6, the latch device 100 is further moved in the first direction 201 toward the mount 180 to secure the latch device 110 in a fully locked position. The striker bar 190 is received in the notch 160 between the inner surface 142 of the first flange 140 and the inner surface 152 of the second flange 150. The pawl latch 170 rotates in the second rotational direction 174 in which the pawl latch 170 is biased to rotate until the cam edge 178 of the pawl latch 170 rests against the striker bar 190. The cam edge 178 of the pawl 170 continues to engage the inner surface 142 of the first flange 140 to prevent the latch 130 from being able to rotate in the first rotational direction 134 (FIG. 1) in which it is biased, continuing to hold the latch device 110 into a locked position.

With reference to FIG. 6, if foreign materials (such as dirt, ice, or other materials) on the striker bar 190—such as those that may block the pawl 170 from fully rotating against the striker bar—become dislodged, then the pawl 170 will automatically continue to rotate in the second rotational direction 174 to further tighten its hold against the striker bar 190.

Figure 7:
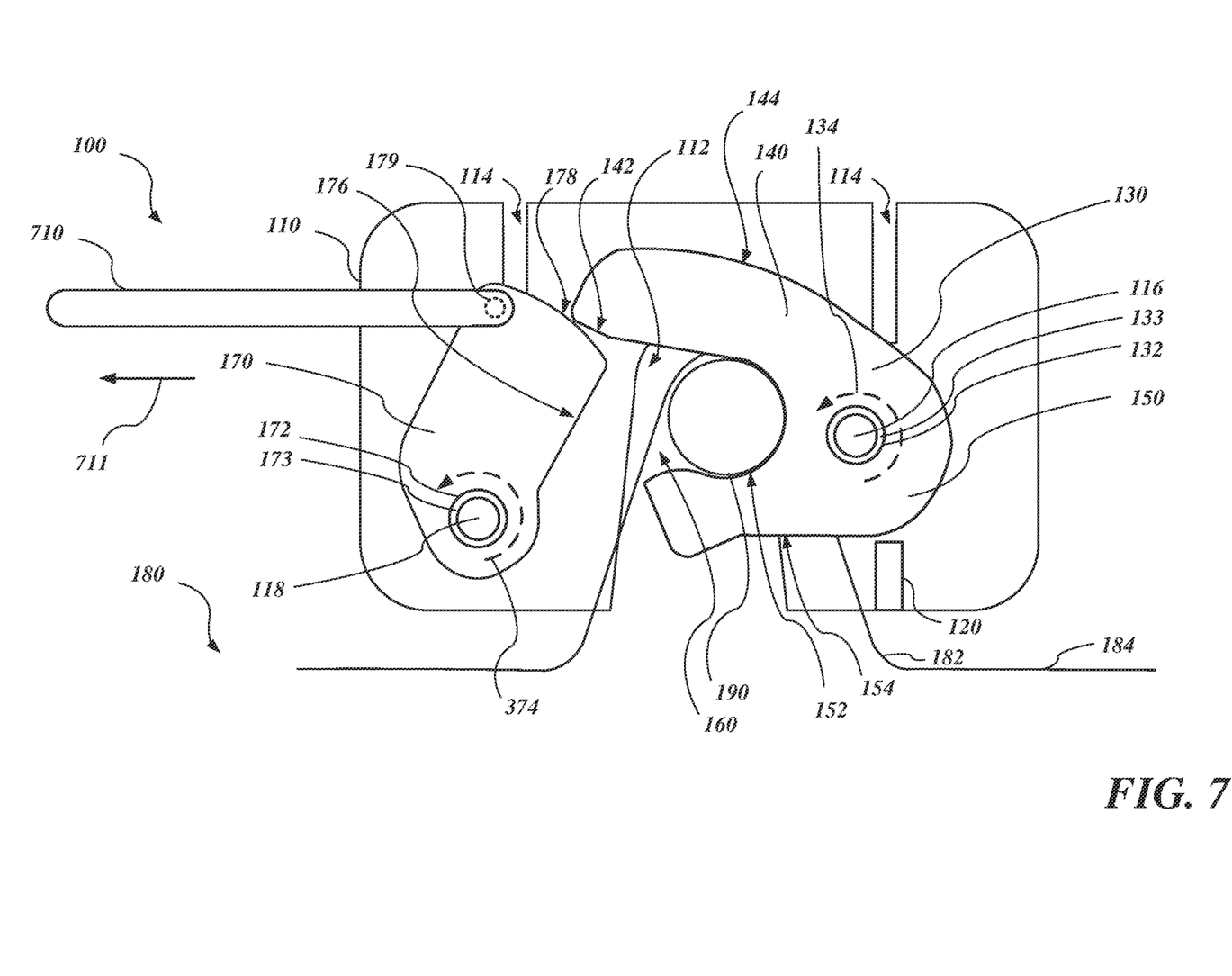

As shown in FIG. 7, to unlock the latch device 100 to remove it from the striker bar 190 of the mount 180, the pawl 170 is rotated in the second rotational direction 374 opposite the first rotational direction 174 (FIGS. 1, 5, and 6) in which it is biased to rotate. Rotating the pawl 170 in the first rotational direction 374 removes the cam edge 178 from the inner surface 142 of the first flange 140 and, thus, enables the latch 130 to rotate in the first rotational direction 134 in which it is biased to rotate. The latch 130 is thus able to rotate toward the open position (FIGS. 1 and 2).

To rotate the pawl 170 to unlock the latch device 100, a release device 710 applies a force 711 on the release structure 179 of the pawl 170 to exert a moment on the pawl 170 to cause the pawl 170 to rotate in the second rotational direction 374. The release device 710 may include a solid linkage, such as a rod, or a flexible linkage, such as a cord. The release device 710 may remain continually coupled with the release structure 179 at all times or the release device 710 may be couplable with the release structure 179 when it is desired to unlock the latch device 100. In either case, in various embodiments the release structure 179 may include an orifice and the release mechanism 710 may include a protrusion configured to engage the orifice, or the release structure 179 may include a protrusion and the release mechanism may include a coupling configured to receivably engage the protrusion.

Figure 8:
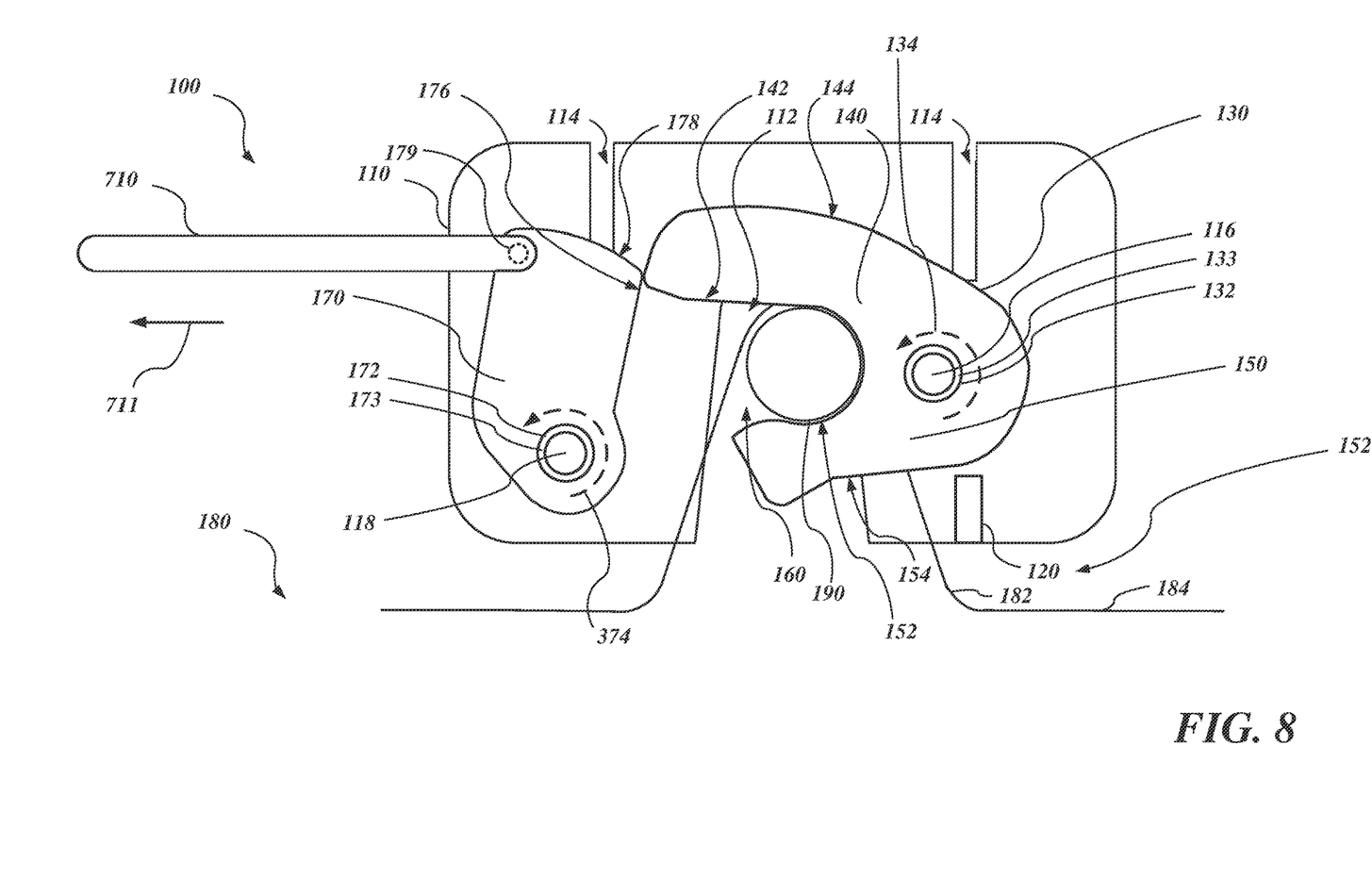
FIGS. 8-9 are plan views of the latch device of FIG. 7 being uncoupled from the striker bar using a release device.

As shown in FIG. 8, the release mechanism 710 continues to be used to exert a force on the release structure 179 of the pawl 170 in the direction 711. The resulting moment exerted on the pawl 170 removes the cam edge 178 of the pawl 170 from the inner surface 142 of the first flange 140, thereby freeing the latch 130 to rotate in the first rotational direction 134 in which it is biased to rotate. With the cam edge 178 of the pawl 170 no longer blocking the rotation of the latch 130, the latch 130 may rotate until the outer surface 154 of the second flange 150 contacts the latch stop 120.

Figure 9:
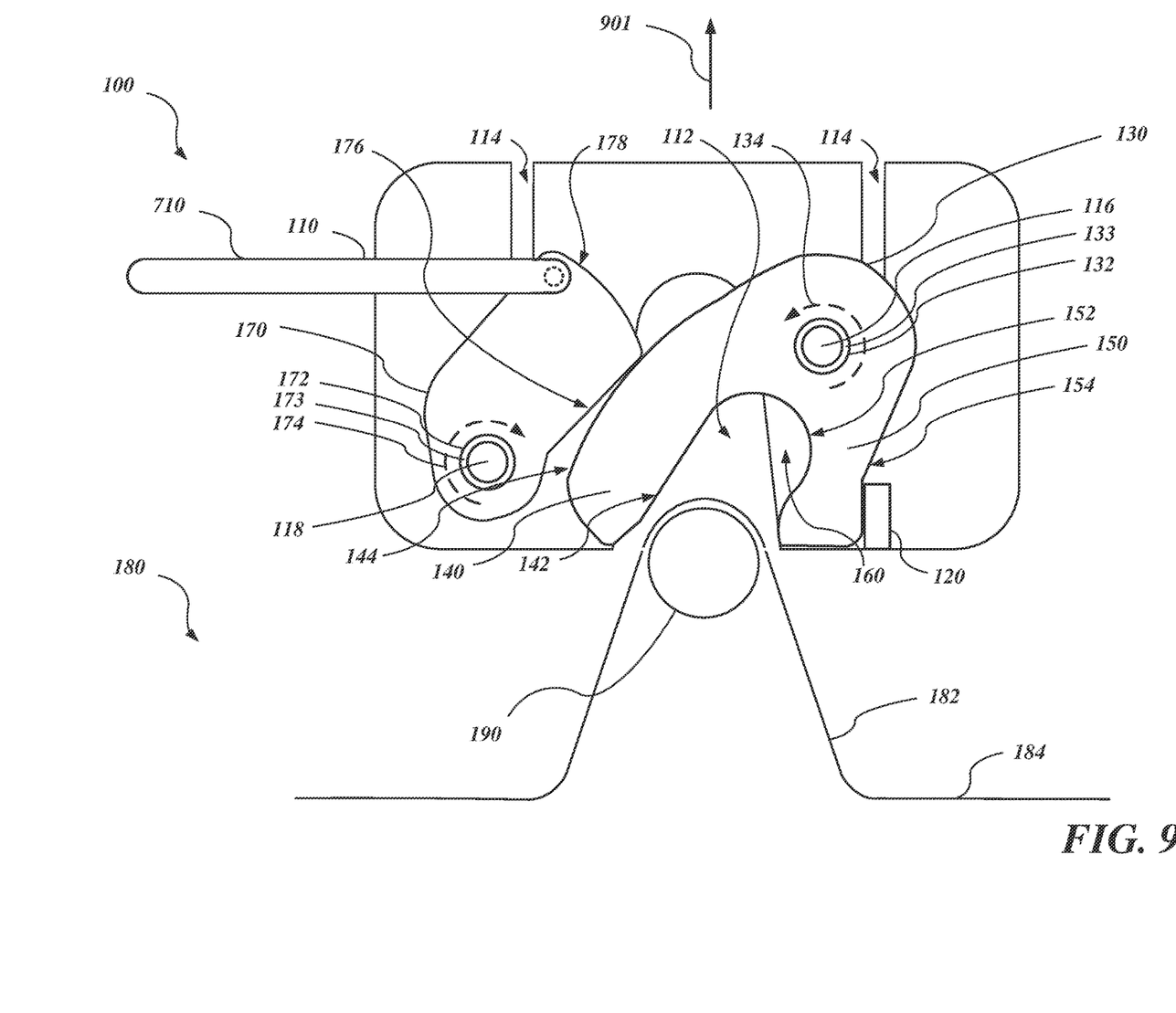

As shown in FIG. 9, the latch 130 is rotated to its original, open position, with the outer surface 154 of the second flange 150 abutting the latch stop 120. The notch 160 defined by the inner surface 142 of the first flange 140 and the inner surface 152 of the second flange 150 is aligned with the slot 112 in the support bracket 110. The latch device 100 may be moved in a direction 901 to withdraw the latch device 100 (and whatever structure, not shown in FIGS. 1-8) associated therewith from the striker bar 190, the mount 180, and the body (not shown in FIGS. 1-8) to which the mount 180 is attached.

Figure 10:
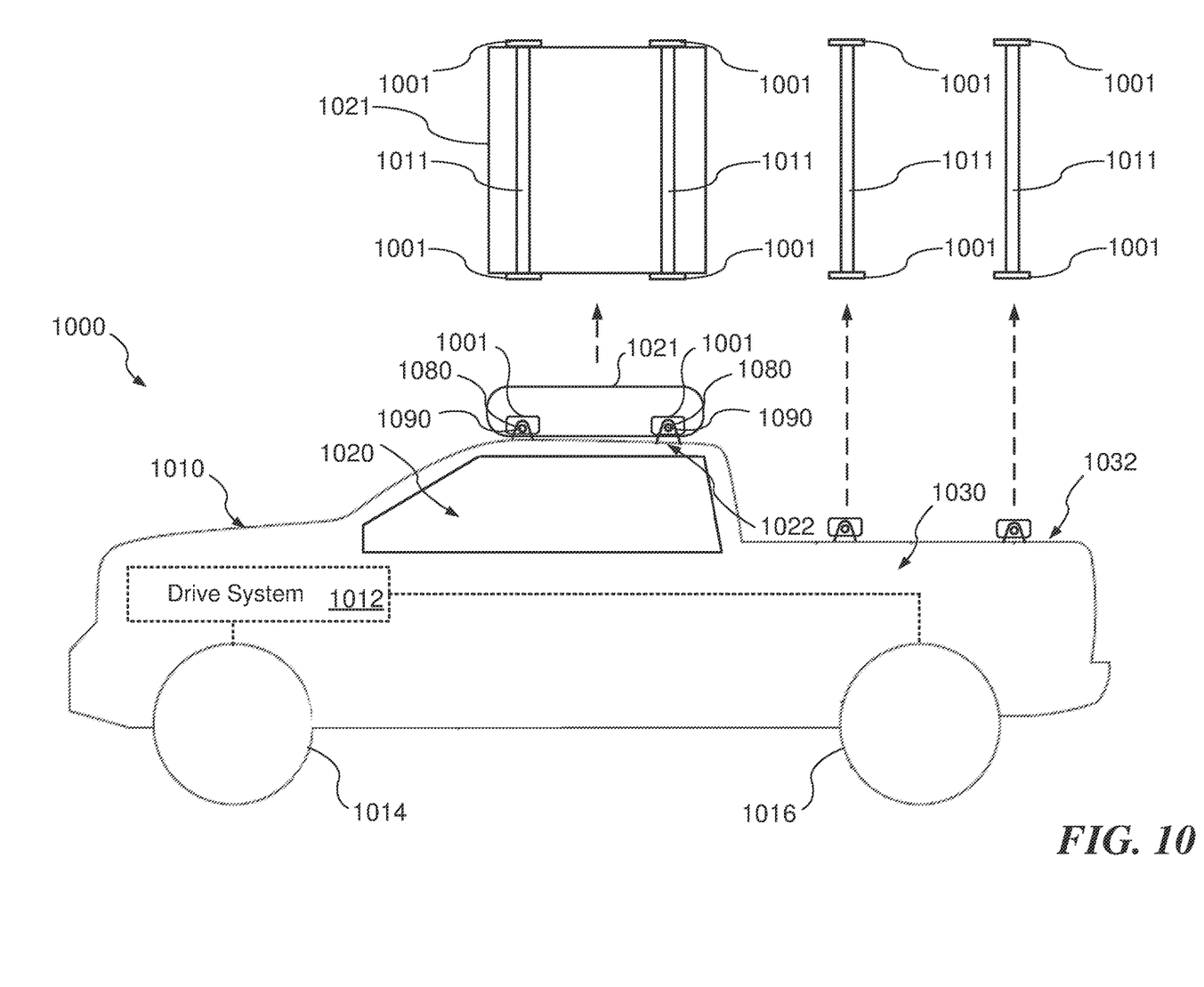
FIG. 10 is a diagram in partial schematic form of an illustrative vehicle that includes mounts configured to receive latch devices of FIGS. 1-9.

Referring additionally to FIG. 10, a vehicle 1000 is configured to receive a securable apparatus that includes the latch device 100 of FIGS. 1-9. The vehicle 1000 includes a vehicle body 1010. The vehicle body 1010 includes a cabin 1020, which is configured to receive one or more occupants and/or cargo. The vehicle body 1010 also may include a cargo area 1022, such as a trunk or a truckbed. The vehicle 1000 also includes a drive system 1012 coupled to the front wheels 1014 and/or the rear wheels 1016 to accelerate, decelerate, stop, steer, and otherwise motivate the vehicle 1000. The drive system 1012 may include an electric drive system, an internal combustion drive system, a hybrid electric and internal combustion drive system, or some other drive system.

The vehicle body 1010 may include one or more mounts 1080, comparable to the mount 180 (FIGS. 1-9). Each of the mounts 1080 may include a striker bar 1090 to engage a latch device 1001 comparable to those previously described with reference to FIGS. 1-9. The mounts 1080 may be permanently mounted to the vehicle body 1010, such as on a roof 1022 of the cabin 1020 or built into a surface 1032 adjoining the cargo area 1030, such a trunk lid or side rails of a truckbed.

The latch devices 1001 may be coupled at or near opposing ends of a securable apparatus, such as bars 1011. The bars 1011 may be coupled with a cargo box or cargo basket 1021. The bars 1011 may be standalone devices such as cargo rails to support or hold down cargo. Additional devices, such as clamps to engage bicycles, kayaks, skis, or other devices may engage the bars 1011 to support said objects. Alternatively, the bars 1011 may include crossmembers that support a cargo box or cargo basket 1021.

Figure 11:
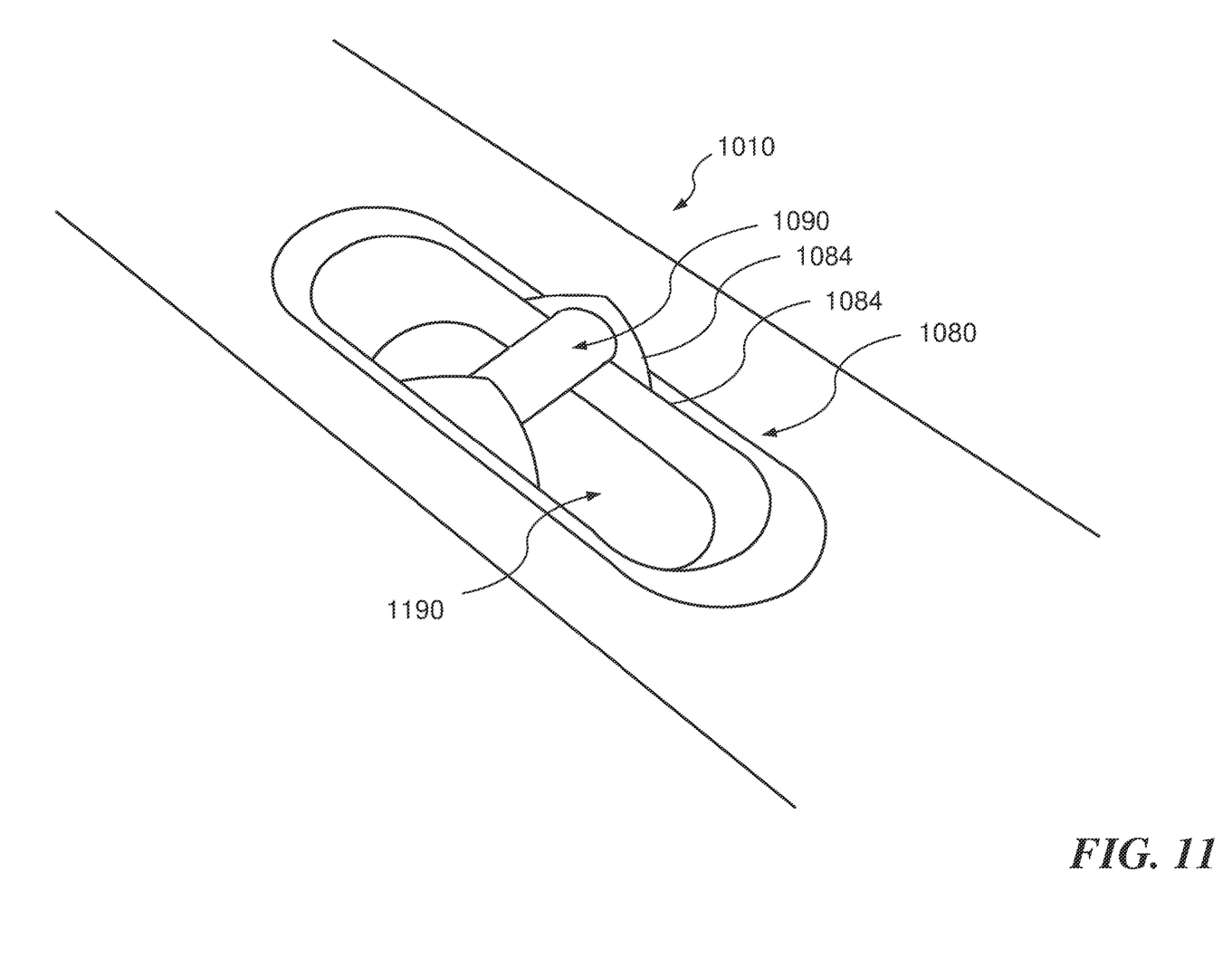
FIG. 11 is a perspective view of a mount supporting a striker bar configured to be secured to a body of the vehicle of FIG. 10.

Referring additionally to FIG. 11, the mount 1080 may be incorporated into a surface of the vehicle body 1010 or attachable to the vehicle body 1010, such as by using clamps or other attachment devices. As in the mount 180 (FIGS. 1-9), the mount 1080 may include a striker bar 1090 that is supported by one or more brackets 1082 above a base 1084. The base 1084, which may be incorporated into or attachable to the vehicle body 1010—or another body—may define a recess 1190 to enable the latch device to be partially received into the mount 1080.

Figure 12:
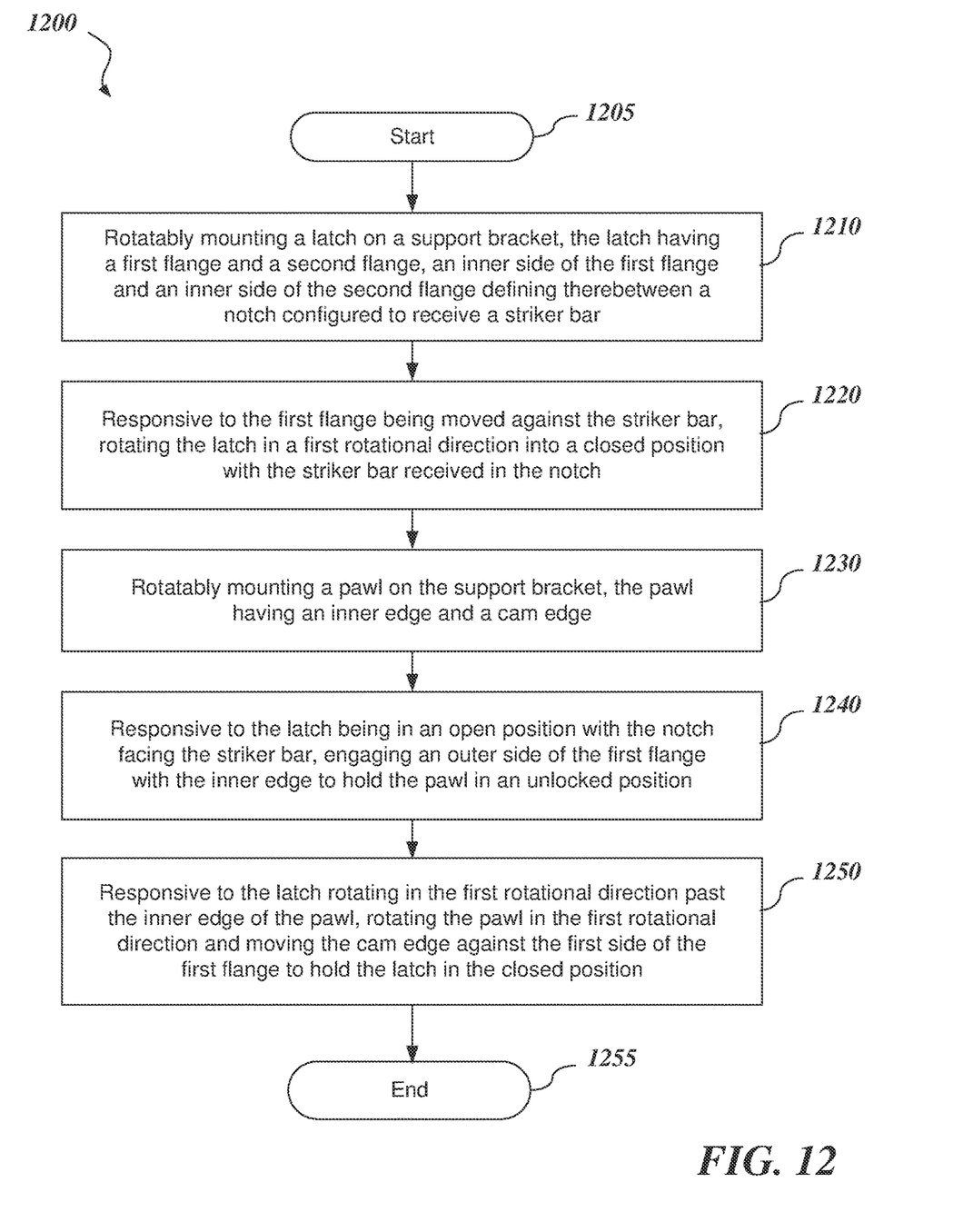
FIG. 12 is a flow chart of an illustrative method of providing a latch device.

Referring additionally to FIG. 12, an illustrative method 1200 of providing a latch device is provided. The method 1200 starts at a block 1205. At a block 1210, a latch is rotatably mounted on a support bracket. The latch has a first flange and a second flange and an inner side of the first flange and an inner side of the second flange define therebetween a notch configured to receive a striker bar. At a block 1220, responsive to the first flange being moved against the striker bar, the latch is rotated in a first rotational direction into a closed position with the striker bar received in the notch. At a block 1230, a pawl is rotatably mounted on the support bracket, with the pawl having an inner edge and a cam edge. At a block 1240, responsive to the latch being in an open position with the notch facing the striker bar, an outer side of the first flange is engaged with the inner edge to hold the pawl in an unlocked position. At a block 1250, responsive to the latch rotating in the first rotational direction past the inner edge of the pawl, the pawl is rotated in the first rotational direction, moving the cam edge against the first side of the first flange to hold the latch in the closed position. The method 1200 ends at a block 1250.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to." or other past-tense adjectives are generally not intended to exclude such variants, unless context dictates otherwise.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. An apparatus comprising:
   a support bracket;
   a latch rotatably mounted on the support bracket and having a first flange and a second flange, an inner side of the first flange and an inner side of the second flange defining therebetween a notch configured to receive a striker bar, the latch being rotatable in a first rotational direction into a closed position with the striker bar received in the notch responsive to the striker bar being moved against the inner side of the first flange; and a pawl rotatably mounted on the support bracket, the pawl having an inner edge and a cam edge, an outer side of the first flange being configured to engage the inner edge to hold the pawl in an unlocked position responsive to the latch being in an open position with the notch facing the striker bar, the pawl being configured to rotate in the first rotational direction and the cam edge being configured to move against the inner side of the first flange to hold the latch in the closed position responsive to the latch rotating in the first rotational direction past the inner edge of the pawl responsive to the striker bar being moved against the inner side of the first flange, wherein, when the latch is in the closed position, the cam edge of the pawl contacts both the inner side of the first flange and the striker bar.

2. The apparatus of claim 1, wherein the pawl is biasable to be rotated in the first rotational direction and hold the latch in the closed position.

3. The apparatus of claim 2, further comprising a release device couplable to the pawl and configured to cause the pawl to rotate in a second rotational direction opposite the first rotational direction such that the cam edge is removable from the first side of the first flange.

4. The apparatus of claim 3, wherein the release device includes at least one actuator chosen from a solid linkage and a flexible linkage.

5. The apparatus of claim 1, wherein the latch is biased to be rotatable in a second rotational direction opposite to the first rotational direction.

6. The apparatus of claim 5, further comprising a latch stop configured to prevent rotation of the latch in the second rotational direction beyond the open position.

7. The apparatus of claim 6, wherein the latch stop extends from the support bracket and is configured to abut an outer side of the second flange in response to the latch being in the open position.

8. A system comprising:
a securable apparatus configured to be joinable to a support body; and
at least one latch device coupled to the securable apparatus, wherein the at least one latch device includes:
a support bracket;
a latch rotatably mounted on the support bracket and having a first flange and a second flange, an inner side of the first flange and an inner side of the second flange defining therebetween a notch configured to receive a striker bar, the latch being rotatable in a first rotational direction into a closed position with the striker bar received in the notch responsive to the striker bar being moved against the inner side of the first flange; and
a pawl rotatably mounted on the support bracket, the pawl having an inner edge and a cam edge, an outer side of the first flange being configured to engage the inner edge to hold the pawl in an unlocked position responsive to the latch being in an open position with the notch facing the striker bar, the pawl being configured to rotate in the first rotational direction and the cam edge being configured to move against the inner side of the first flange to hold the latch in the closed position responsive to the latch rotating in the first rotational direction past the inner edge of the pawl responsive to the striker bar being moved against the inner side of the first flange, wherein, when the latch is in the closed position, the cam edge of the pawl contacts both the inner side of the first flange and the striker bar.

9. The system of claim 8, wherein the pawl is biasable to be rotated in the first rotational direction and hold the latch in the closed position.

10. The system of claim 9, further comprising a release device couplable to the pawl and configured to cause the pawl to rotate in a second rotational direction opposite the first rotational direction such that the cam edge is removable from the first side of the first flange.

11. The system of claim 10, wherein the release device includes at least one actuator chosen from a solid linkage and a flexible linkage.

12. The system of claim 8, wherein the latch is biased to be rotatable in a second rotational direction opposite to the first rotational direction.

13. The system of claim 12, further comprising a latch stop configured to prevent rotation of the latch in the second rotational direction beyond the open position.

14. The system of claim 13, wherein the latch stop extends from the support bracket and is configured to abut an outer side of the second flange in response to the latch being in the open position.

15. The system of claim 8, further comprising a rod having at least a first latch device disposable toward a first end of the rod and a second latch device disposable toward a second end of the rod.

16. The system of claim 15, wherein the rod includes a cargo rail configured to extend across one of a roof, a bed, and a trunk of a vehicle.

17. The system of claim 15, wherein the rod includes a cross-member of a cargo rack.

18. A method comprising:
rotatably mounting a latch on a support bracket, the latch having a first flange and a second flange, an inner side of the first flange and an inner side of the second flange defining therebetween a notch configured to receive a striker bar;
responsive to the striker bar being moved against the inner side of the first flange, rotating the latch in a first rotational direction into a closed position with the striker bar received in the notch;
rotatably mounting a pawl on the support bracket, the pawl having an inner edge and a cam edge;
responsive to the latch being in an open position with the notch facing the striker bar, engaging an outer side of the first flange with the inner edge to hold the pawl in an unlocked position; and
responsive to the latch rotating in the first rotational direction past the inner edge of the pawl responsive to the striker bar being moved against the inner side of the first flange, rotating the pawl in the first rotational direction and moving the cam edge against the inner side of the first flange to hold the latch in the closed position, wherein, when the latch is in the closed position, the cam edge of the pawl contacts both the inner side of the first flange and the striker bar.

19. The method of claim 18, further comprising:
biasing the pawl to rotate in the first rotational direction; and
biasing the latch to rotate in a second rotational direction opposite to the first rotational direction.

20. The apparatus of claim 1, wherein, when the latch is in the closed position, the cam edge of the pawl contacts the inner side of the first flange, the striker bar, and the inner side of the second flange.

* * * * *